Jan. 20, 1959     H. G. ANASTASIA     2,869,365
INSTRUMENT MOVEMENT CORRECTION MEANS
Filed Jan. 3, 1955
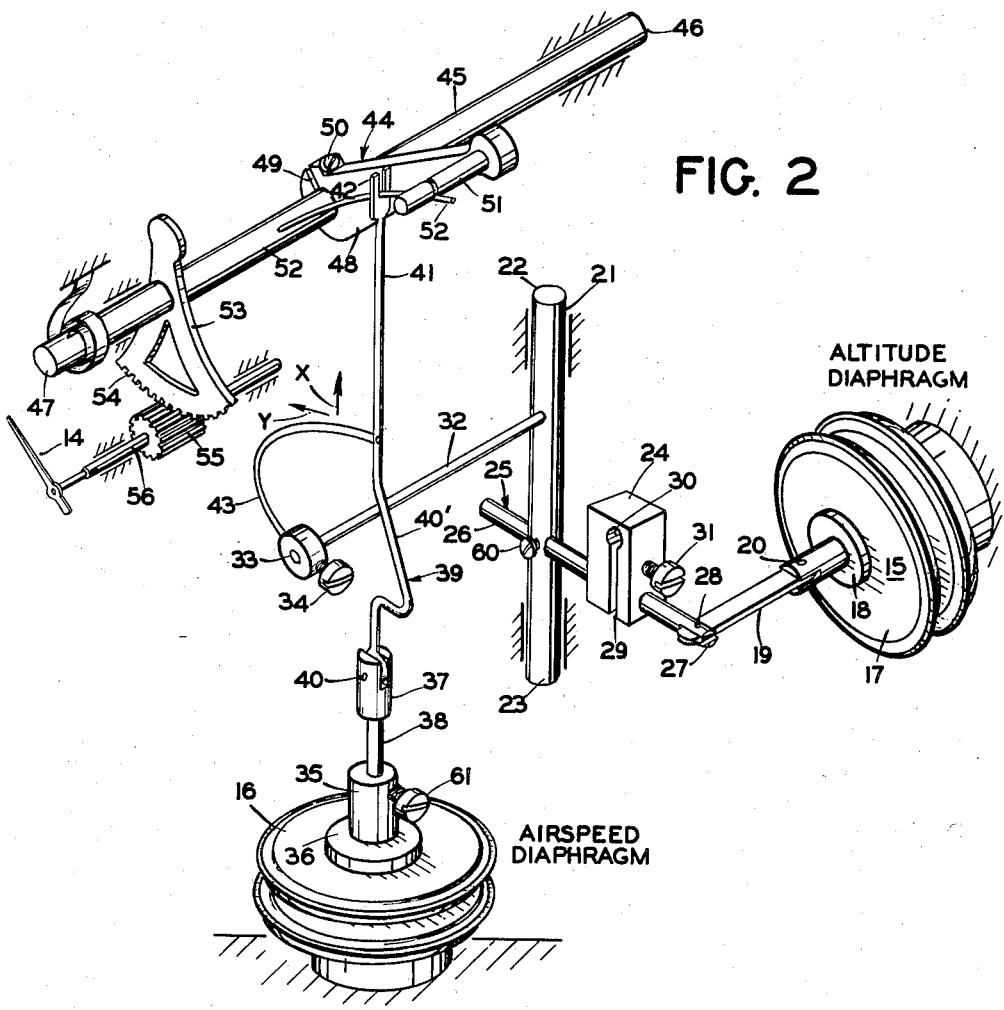
FIG. 2
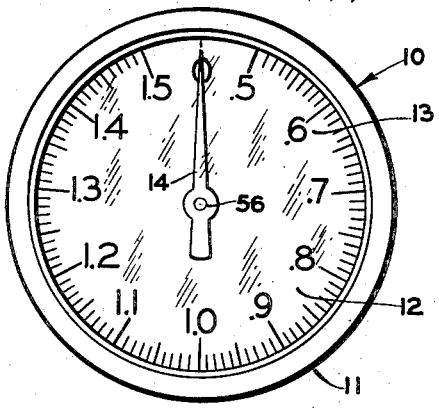
FIG. 1
INVENTOR.
HARRY G. ANASTASIA
BY
ATTORNEY United States Patent Office 2,869,365
Patented Jan. 20, 1959

2,869,365

INSTRUMENT MOVEMENT CORRECTION MEANS

Harry G. Anastasia, Paramus, N. J., assignor to Bendix Aviation Corporation, Teterboro, N. J., a corporation of Delaware Application January 3, 1955, Serial No. 479,370

2 Claims. (Cl. 73—181)

This invention pertains to instruments, and more particularly to instruments wherein an input is converted to develop an output indication.

The present invention is illustrated as being incorporated in a Machmeter, although the invention may be incorporated in other devices, particularly those utilizing pressure responsive means, such as diaphragms or aneroids.

The device of the present invention is particularly suited for instruments employing small precision type movements or linkages wherein a number of motions are applied to a common linkage which is designed to coordinate the individual movements and deliver a shaft output relative to a reference position to provide a visual indication or an electrical output for a transmitting system.

Heretofore, in instruments of the general type for measuring air pressures, the pressure responsive devices, such as diaphragms, were specifically designed to obtain in the operation a suitable diaphragm curve for the particular instruments employed. In indicators, such as Machmeters and the like, where different pressures are measured, each diaphragm had elements associated therewith to follow a predetermined geometric pattern. Regardless of the precision acquired in manufacturing the various elements, there is always some correction that is ultimately required after the elements for the different diaphragms are combined to provide a single output. This final adjustment was always difficult to make because of the means provided to include a curve function in a combined output of multiple pressures, encountered particularly when employing formulas of aerodynamics. The present invention overcomes the undesirable features mentioned above.

An object of the present invention, therefore, is to provide an instrument having novel correction means.

A further object of the invention is to provide an instrument having novel means to introduce a calibration into a substantially fixed geometric type linkage.

A further object of the invention is to provide novel corrector means for combined individual outputs of diaphragm elements responsive, respectively, to differential pressure and static pressure.

Another object of the invention is to provide a novel cam link so that the activity of conventional diaphragms will be compatible with the calibrations on a dial.

Another object is to provide a novel cam link for a Machmeter so that conventional diagram activity will be compatible with instrument dial spacings which are substantially linear for Mach numbers less and greater than 1.0.

A further object of the invention is to provide a novel adjustable cam corrector which permits a correction to be introduced into the usable output of the combined individual outputs of diaphragms responsive respectively to different variable pressures.

The present invention contemplates an instrument, such as a Machmeter, which provides a single usable output from two combined individual outputs connected to diaphragms responsive respectively to differential pressure and static pressure. While the instrument provides an adjustment means for a linkage arrangement connected with two different diaphragms, it also provides an adjustable cam arm for changing the shape of resilient material, such as spring wire, or music wire. One end of the length of music wire is secured to an angularly displaceable member, such as a rock shaft. A cam arm is adjustably mounted on the rock shaft and has a pin normal thereto which engages the free end of the spring wire. By holding the rock shaft stationary and rotating the cam arm, the pin on the cam arm will bend the spring wire to a desired curvature. A link connected to the combined output of two diaphragms engages the curve spring wire. The degree of cam arm rotation relative to the rock shaft determines the extent of the correction for the usable output.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and not to be construed as defining the limits of the invention.

In the drawings:

Fig. 1 is a front view of a representative dial on a Machmeter.

Fig. 2 is a schematic representation of a Machmeter employing the present invention.

Referring to the drawings and more particularly to Fig. 1, there is shown an instrument 10 having a casing 11 with a transparent closure 12, or window, to permit a viewer to see the dial 13 of the instrument which is graduated linearly in Mach number below and above Mach 1.0, and having a movable pointer 14 operated by the mechanism within the instrument to indicate the particular Mach number at which the craft using the instrument is then flying.

In Fig. 2 there is shown an evacuated diaphragm 15 which has the underneath portion secured within the housing in any suitable or conventional manner, and is responsive to static pressure ($P_s$) which varies with changes in altitude. This diaphragm is sometimes referred to as the altitude responsive diaphragm.

A second diaphragm 16 is also mounted within the instrument and secured thereto in any convenient or conventional manner. The diaphragm 16 has a conventional opening in the underneath side thereof which is connectible to a pitot static head so that the impact pressure therethrough will cause deflection of the diaphragm 16 in response to changes thereof. This diaphragm 16 is sometimes called the airspeed diaphragm.

The rear portion of the casing 11 has conventional ports therein for communication with the static pressure and the impact pressure of a conventional pitot static head. The static pressure entering through its respective port in the rear of the instrument is communicated to the diaphragm 15 internally of the instrument so that changes in static pressure will cause corresponding changes in movement of the upper surface 17 of the diaphragm 15. The diaphragm 16 has impact pressure therewithin to cause movement of the upper surface 17, while static pressure within the casing of the instrument will be exerted externally on said diaphragm 16.

A hub 18 is secured to the upper surface 17 of the evacuated diaphragm 15 by soldering or the like, and is pivotably connected to a link 19 by a pin 20. A static pressure rock shaft is pivotably mounted within the casing in any convenient manner adjacent the ends 22 and 23 to permit the static pressure rock shaft 21 to be rotated. The end of the link 19 opposite the hub 18 is connected to the rock shaft 21 by a two-portion arm 25 having a vernier type adjustment means 24 connected intermediate the two portions of said arm. One portion of the arm 26 is slidable through a suitable hole within the rock shaft, while a screw 60 is threadedly connected through a portion of the rock shaft to engage said portion 26 in said hole in a fixed position relative to the rock shaft 21. The other portion 27 of the two-portion arm 25 is pivotably connected to one end of the link 19 by a pin 28 to permit pivotal movement between said parts.

The vernier type adjustment means 24 is in the form of a block having an elongated slot 29 therein terminating in an enlarged opening 30. The slot and the opening have continuous communication with each other and from one side of the block to the other to provide resiliency between the opposite sides of the slot surface. An adjustment screw 31 is threadedly connected in one portion of the block on one side of the slot to engage a surface of the block on the opposite side of the slot so that the screw may be tightened or screwed into the block to impinge the opposite side of the slot and cause the slot to be widened or the screw may be loosened or unscrewed whereby the slot width is decreased, so that the effective length of the arm 25 may be increased or decreased as desired. The end portions 26 and 27 of the arm 25 are secured to their respective portions of the slotted block 24 in any convenient manner, such as by threading the portions into the block or by soldering the portions to the block.

A rod 32 is secured to the rock shaft 21 at one end thereof, and adjacent the other end thereof there is located a collar 33 which is affixed thereto either by soldering or in some other conventional manner, or by means of a screw 34 which will permit the collar 33 to be rotated on the rod 32 for angularly positioning said collar relative to the rod.

From the foregoing it will be seen that movement of the diaphragm 15 in response to changes in altitude will cause the linkage to move accordingly, which results in movement of the rod 32, and its rock shaft coupled with the pointer 14.

The airspeed diaphragm has a hub 36 secured to the upper surface thereof with a tubular portion 35 secured to said hub normal thereto. A bifurcated pin 37 has a lower portion 38 which is adjustably positioned within a hole of said tubular portion 35 and is secured in any desired position by tightening the screw 61. Cam link 39 has a lower portion thereof connected to the bifurcated pin 37 by a pin 40 so that the cam link and the bifurcated pin are pivotably connected. The cam link 39 has a camming portion 40' adjacent the lower end thereof and a straight portion 41 which is connected to a bifurcated portion 42. A spring 43 is secured at one end thereof to the cam link 39, while the opposite end of said spring is secured to the collar 33. By means of the spring 43, the cam link is urged upwardly in the direction of the arrow X and simultaneously to the left in the direction of arrow Y, so that the spring 43 holds the cam link 39 in slidable engagement with the cam element 52 and also urges the cam link upwardly, so that the base of the bifurcated portion 42 is in constant engagement with a cam arrangement 44.

Rock shaft 45 is pivotably mounted adjacent ends 46 and 47, with the framework within the casing in a convenient manner.

An adjustable cam arm 48 has a split portion defined by a slot 49 with a screw 50 being threadably connected within the adjustable cam arm 48, so that the screw may be loosened to permit rotation of the adjustable cam arm on the rock shaft 45, and the screw may be tightened to secure the adjustable cam arm 48 in a desired adjusted angular position on the rock shaft 45. A cam pin 51 is secured at the free end of the cam arm 48 in a position normal thereto. A cam element 52 is a resilient element which is shown as a piece of spring wire which is commonly called "music wire." One end of said cam element 52 is secured to the rock shaft 45, while the opposite end of said cam element 52 extends below and in engagement with the cam pin 51. While one end of the cam element 52 is shown secured to the rock shaft 45, it is to be understood that the cam element may be mounted on a collar somewhat similar to 33 to permit rotation of the particular end of the cam element. A desired curve may be formed in the cam element 52 by holding the rock shaft 45 stationary and urging the free end of the adjustable cam arm 48 downwardly to increase the tension on the cam element caused by the cam pin 51 exerting pressure on the free end of the cam element 52, thereby causing the cam element to be bent or bowed into a desired configuration conforming with the extent of the curvature or correction desired to be included in the output.

The rock shaft 45 has a conventional sector 53 secured thereto with a toothed portion 54 in engagement with a rotatable pinion 55, which pinion is mounted within the casing. A pointer shaft 56 is secured to the pinion at one end thereof, while the opposite end thereof projects through an opening in the calibrated dial 13, so that the pointer 14 may be connected thereto.

Accordingly, any diaphragm deflection caused by changes in airspeed or altitude resulting from movement of said airspeed or altitude diaphragms will cause the pointer 14 to be moved accordingly to give an indication of the then Mach number by the relative positioning of the pointer and the dial.

The cam link 39 is designed with a suitable curvature so that conventional diaphragm activity will result which will be compatible with the calibrations on the dial, said dial calibrations being substantially linear. The cam link curvature is designed for the particular type of diaphragm used, since different type diaphragms have diaphragm deflection curves which are dissimilar. In order to eliminate the designing of a special diaphragm for the particular type instrument, in the present case a Machmeter, the cam link permits the use of conventional diaphragms. Said cam link modifies the deflection curve of its respective diaphragm by means of a predetermined cam that introduces a deflection curve deviation.

With the present arrangement it is possible to provide a correction to be introduced into the usable output of the combined outputs of the differential pressure ($\Delta P$) and static pressure ($P_S$) diaphragms, which diaphragms have already been coupled through their respective elements to follow a predetermined geometric pattern to be congruous with the Mach number equation, viz., $$M = \frac{\Delta P}{P_s}$$

where:

$M$=Mach number
$\Delta P$=impact pressure minus static pressure
$P_S$=static pressure.

According to report No. 837 of the National Advisory Committee for Aeronautics, dated 1946, the Mach number is defined as the ratio of the true airspeed to the speed of sound in ambient air. It is represented by the formula:

$$M = \frac{V}{a}$$

where:

$M$=Mach number
$V$=true airspeed
$a$=speed of sound in ambient air.

Accordingly, while the definition of Mach number refers to the "ratio of the true airspeed to the speed of sound," report No. 837 clearly shows that Mach number is also a function of the differential pressure and the static pressure which may be represented in a curve. This is true for Mach number in the subsonic range, as well as in the supersonic range, with the curves blending in the transonic area.

The adjustable cam corrector of the present invention has been designed and incorporated in the Mach number or Machmeter mechanism so that the aforementioned curve blending at the transonic interval is accomplished and controlled by said cam corrector device. The adjustable cam corrector may also be utilized in other apparatus where such kindered curve blending is dictated by mathematical equations.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An instrument comprising a displaceable element, means for displacing said element in accordance with the magnitude of a condition, an indicator, a rotatable shaft coupled to said indicator, an arm extending laterally from said shaft, a flexible member having an end fixed to the shaft and an end connected to the arm and having a cam surface in engagement with said displaceable element, and means for providing indicator movement as a desired function of the displacement of said element comprising means for altering the rotational position of said arm relative to said shaft whereby to vary the flexure of said flexible member.

2. A Machmeter comprising indicating mechanism incorporating a rotatable shaft having an arm extending laterally therefrom, means for adjusting the rotational position of said arm on said shaft, a flexible cam fixed to the shaft at one end and to the arm at the other end and having a cam surface lying in a plane radial to the shaft, a cam follower engaging said cam surface and movable in the radial and transverse direction relative to said shaft, and means sensitive to changes in altitude for moving said follower in one of said directions and sensitive to changes in airspeed for moving said follower in the other of said directions.

References Cited in the file of this patent

UNITED STATES PATENTS

| | | |
|---|---|---|
| 2,251,498 | Schwein | Aug. 5, 1941 |
| 2,302,713 | Paulin | Nov. 24, 1942 |
| 2,324,666 | Angst | July 20, 1943 |
| 2,522,337 | Angst | Sept. 12, 1950 |
| 2,563,207 | Bevins | Aug. 7, 1951 |
| 2,682,768 | White | July 6, 1954 |

FOREIGN PATENTS

| | | |
|---|---|---|
| 436,552 | Great Britain | Oct. 14, 1935 |
| 887,030 | France | July 26, 1943 |